United States Patent [19]

Tisdale et al.

[11] Patent Number: 4,497,065
[45] Date of Patent: Jan. 29, 1985

[54] TARGET RECOGNITION SYSTEM ENHANCED BY ACTIVE SIGNATURE MEASUREMENTS

[75] Inventors: Glenn E. Tisdale, Severna Park; Harley B. Lindemann, Catonsville, both of Md.

[73] Assignee: Westinghouse Electric Corp., Pittsburgh, Pa.

[21] Appl. No.: 397,258

[22] Filed: Jul. 12, 1982

[51] Int. Cl.³ .................. G01B 11/26; G06K 9/00
[52] U.S. Cl. ........................... 382/1; 244/3.15; 356/4; 356/152; 358/125; 382/48
[58] Field of Search ............... 382/1, 48, 21, 36–37; 358/125–126, 113; 364/516–517; 250/203 R; 343/6 R, 6 DF, 6 ND; 356/3–5, 152, 375, 386; 455/609, 611; 244/3.13, 3.16–3.18

[56] References Cited

U.S. PATENT DOCUMENTS

| | | | |
|---|---|---|---|
| 3,076,961 | 2/1963 | Bibbero | 343/6 R |
| 3,261,014 | 7/1966 | Diaz | 343/6 R |
| 3,603,686 | 9/1971 | Paine | 358/125 |
| 3,636,513 | 1/1972 | Tisdale | 382/36 |
| 3,638,188 | 1/1972 | Pincoffs et al. | 382/36 |
| 3,748,644 | 7/1973 | Tisdale | 382/21 |
| 3,947,833 | 3/1976 | Eckstein, Jr. | 382/37 |
| 3,953,667 | 4/1976 | Layton et al. | 358/113 |
| 4,034,208 | 7/1977 | Vaeth et al. | 358/125 |
| 4,091,412 | 5/1978 | Salonimer | 358/113 |
| 4,324,491 | 4/1982 | Hueber | 358/125 |
| 4,349,838 | 9/1982 | Daniel | 358/125 |
| 4,386,848 | 6/1983 | Clendenin et al. | 358/125 |

Primary Examiner—Leo H. Boudreau
Attorney, Agent, or Firm—W. E. Zitelli

[57] ABSTRACT

A passive electro-optical target recognition system which utilizes additional signature measurements of an active nature to enhance the discrimination of desired targets from detected candidate targets in the field of view thereof is disclosed. Candidate targets are detected by the passive target recognition system from passive image radiation received from the field of view of its one or more passive sensors. A laser beam generated substantially at a predetermined wavelength is positioned to illuminate individually each of the detected candidate targets. An active sensor tuned to the predetermined wavelength receives the active laser radiation separately reflected from the individually illuminated candidate targets. An active signature is derived for each of the detected candidate targets from its received active image radiation. Accordingly, a desired target is discriminated from the detected candidate targets in the field of view of the passive sensor based on the derived active target signatures thereof. To further enhance this discrimination process, polarizing properties of the laser beam may be used as an additional measurement for each candidate target beyond the derived active target signatures thereof.

10 Claims, 8 Drawing Figures

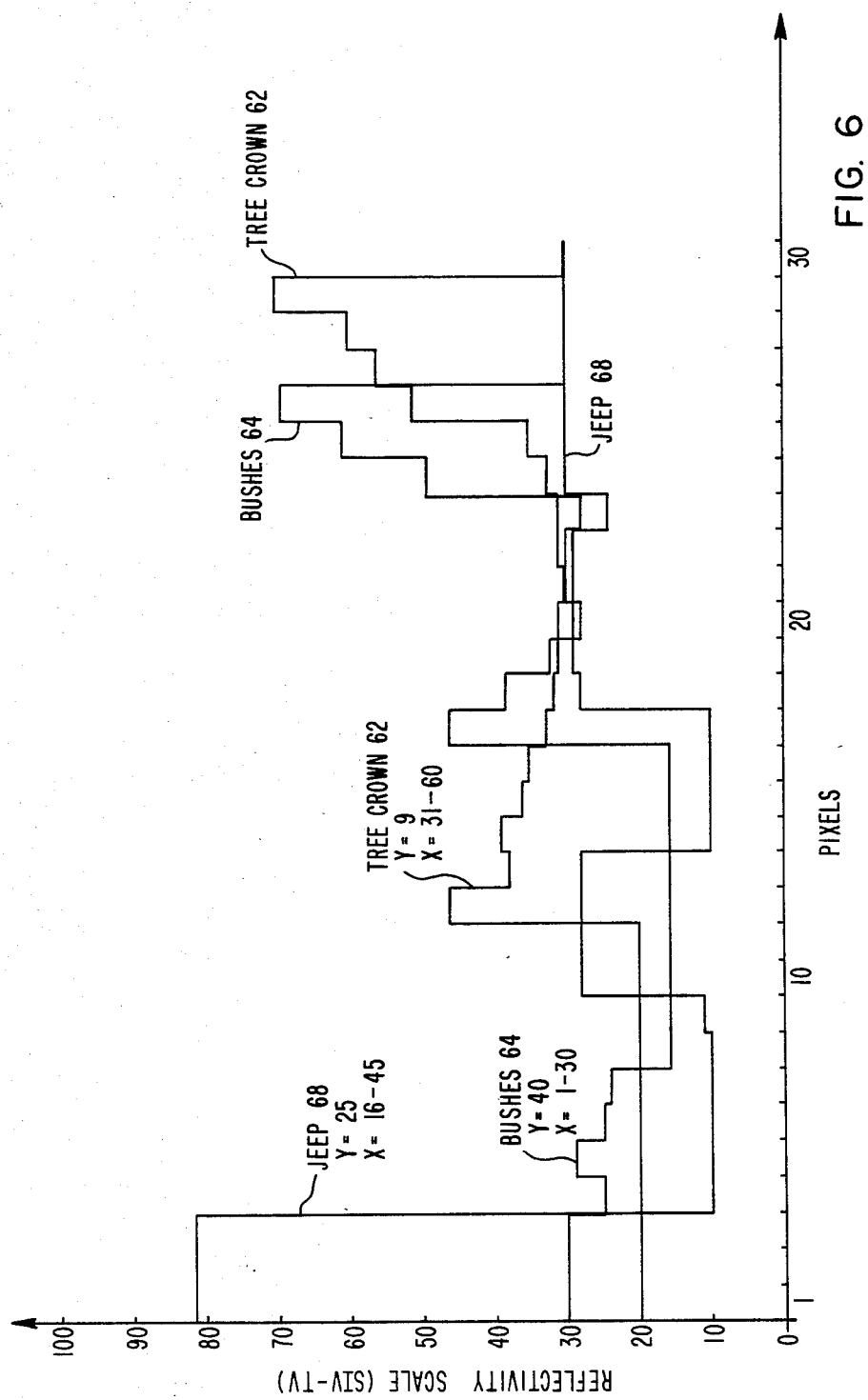

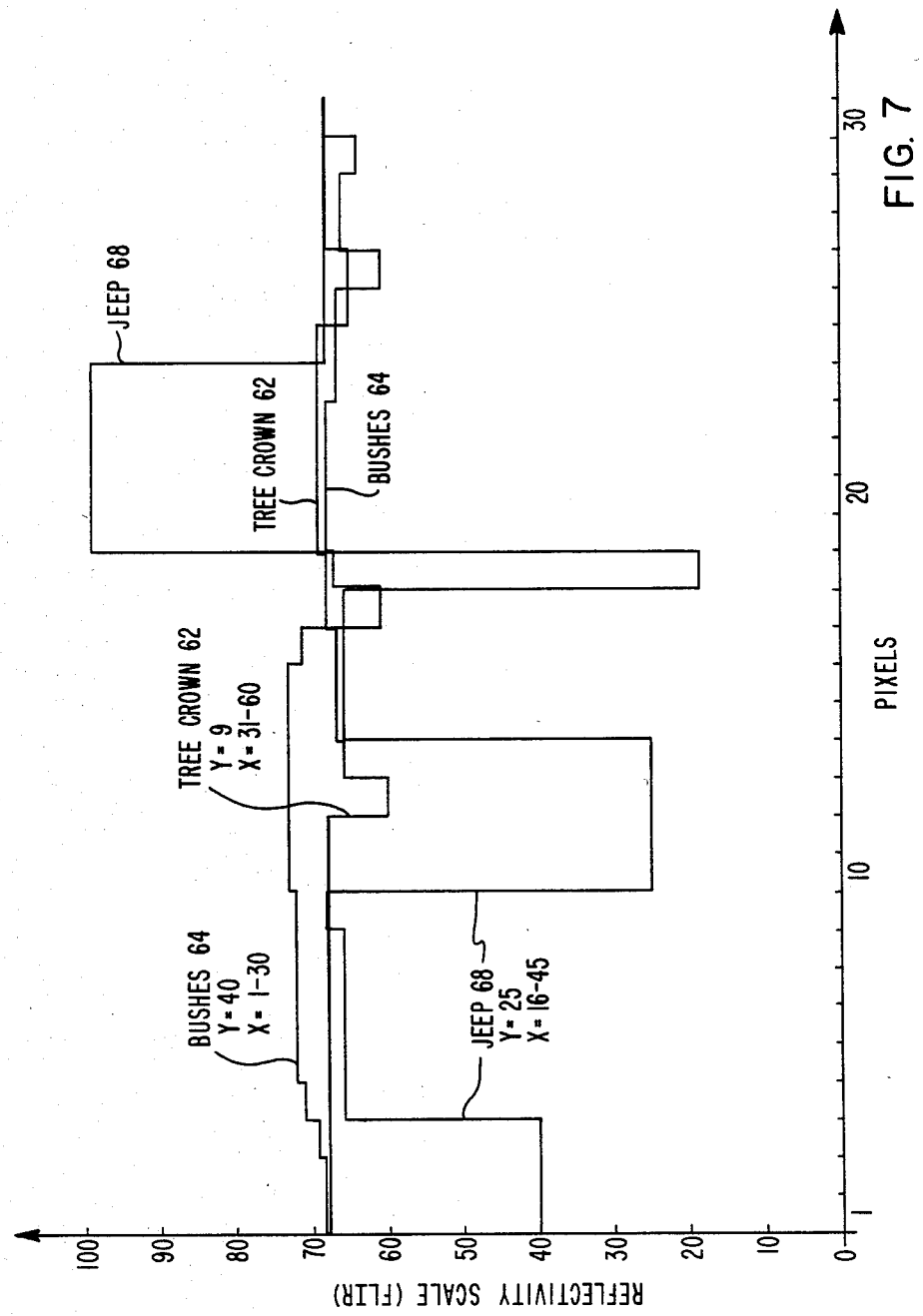

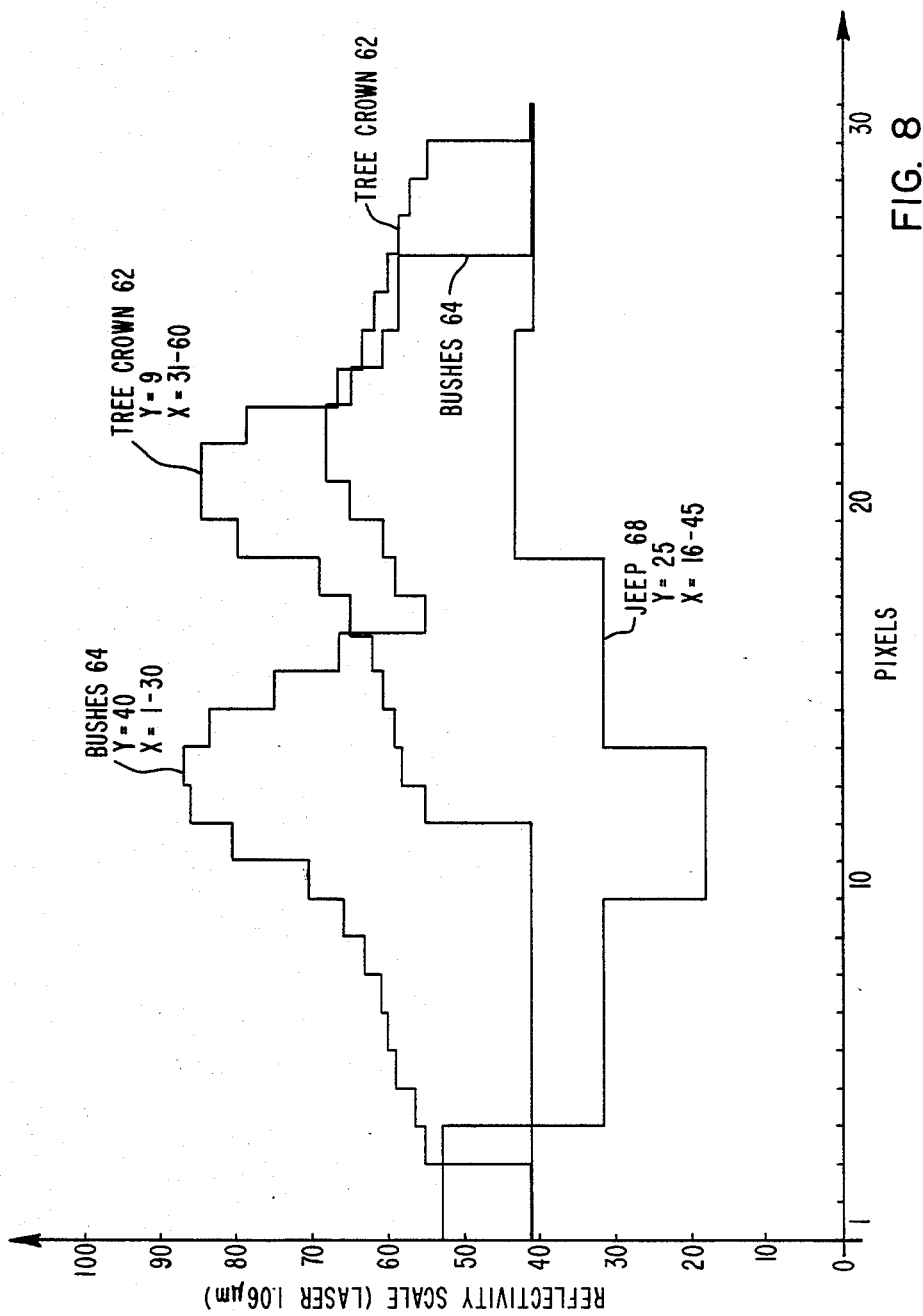

TARGET RECOGNITION SYSTEM ENHANCED BY ACTIVE SIGNATURE MEASUREMENTS

BACKGROUND OF THE INVENTION

The present invention relates to target recognition systems, in general, and more particularly to a passive electro-optical target recognition system which utilizes additional signature measurements of an active nature to enhance the discrimination of desired targets from detected candidate targets in the field of view thereof.

Generally, electro-optical (e/o) target recognition systems operate on the field of view of one or more passive imaging sensors, such as a television camera (TV) or foward-looking infrared detector (FLIR), for example, to isolate targets of interest and signal their presence to an operator by visual cues which may be displayed on a video display (CRT). Audible cueing may also be used. This cueing information may include target classification, location in the video display, and prioritization relative to other targets which may be present in the field of view of the imaging sensor. A measure of the performance of such systems is determined by how well they discriminate targets of interest from background objects so as to avoid false alarms or false omissions.

Some examples of passive e/o target recognition systems and related technology are disclosed in the following U.S. Pat. Nos.:

3,638,188; entitled "Classification Method And Apparatus For Pattern Recognition Systems"; issued to Glenn E. Tisdale et al on Jan. 25, 1972, 3,636,513; entitled "Preprocessing Method And Apparatus For Pattern Recognition"; issued to Glenn E. Tisdale on Jan. 18, 1972, and 3,748,644; entitled "Automatic Registration Of Points In Two Separate Images"; issued to Glenn E. Tisdale in July 24, 1973, all assigned to the same assignee as the instant patent application.

Target recognition systems of this type usually include one or more passive sensors, a preprocessor for converting the sensor image data into a condensed format for further processing, means for collecting or segmenting information associated with individual candidate targets, and means for classifying targets based on derived pertinent measurements or features from the candidate targets. In one known system, the segmentation operation is initiated by the detection of a specific image characteristic, such as a blob or edge, which may become the basis for collection of nearby image information of a scene. Classification is most often based upon the shapes of the candidate target images derived from the segmentation operation, and may also involve textures and intensity data of a candidate target image, or even context information thereof.

As would be expected, at long ranges (i.e. the distance the passive sensor is positioned from the candidate targets), say on the order of 3-5 kilometers, for example, the sensor image information available for a given target diminishes in the presence of background images and clutter. As a result, the ability to correctly classify a target is reduced, thus, the probability of false alarm or false omission occurrence is increased.

Some target recognition systems, like those disclosed in U.S. Pat. Nos. 3,261,014 and 3,076,961 issued July 12, 1966 and Feb. 5, 1963, respectively, have proposed a multi-sensor coordinated system by including a radar with a combination of TV and FLIR passive sensors to increase the amount of information for use in acquiring a target. These systems make use of a second sensor to provide useful information associated with the detection or range of potential targets, but they do not appear to assist in the classification process.

Other target recognition systems, like the one disclosed in U.S. Pat. No. 3,953,667; entitled "Passive And/Or Active Imaging Systems"; issued to Allen C. Layton et al on Apr. 27, 1976, increases its target image information by adding active laser illumination of the field of view in order to enhance the FLIR's capability to discern in a scene certain details, such as man made objects, especially under adverse environmental conditions, like thermal washout, for example. However, this system requires a highly complex mechanization combining the passive and active sensing elements. An advantage of the present invention is that it may be embodied with minor modification of an existing implementation as will become apparent from the description found herein below.

In view of the above, it is recognized that one way of improving both target recognition/classification and false alarm/omission rejection capabilities of a passive target recognition system is by introducing one or more additional image measurements of an active nature, especially when the sensor is at long ranges from the targets of interest so as to ameliorate the lower target resolutions and target to clutter contrast conditions which are prevalent in an all passive system.

SUMMARY OF THE INVENTION

In accordance with the present invention, an electro-optical target recognition system operates on both active and passive radiation from the field of view thereof to discriminate desired targets from detected candidate targets. At least one passive sensor receives passive image radiation from the field of view thereof and converts the received image radiation into first electrical signals representative thereof. A passive target recognition means operates on the first electrical signals to detect candidate targets in the field of view of the passive sensor. In addition, a laser beam is generated substantially at a predetermined wavelength by an active source and is positioned to illuminate individually each of the candidate targets detected by the passive target recognition means. Furthermore, an active sensor tuned to the predetermined wavelength receives the active laser radiation separately reflected from the individually illuminated candidate targets and converts the separately received active laser radiation into respective second electrical signals representative thereof. An active signature is derived for each of the detected candidate targets from the respective second electrical signals. Accordingly, a desired target is discriminated from the detected candidate targets in the field of view of the passive sensor based on the derived active target signatures thereof.

More specifically, the laser beam may be positioned to traverse each detected candidate target region in the field of view individually to effect at least one narrow illumination sweep of each of the regions. The active sensor is operative to collect the active reflected radiation separately from each candidate target region concurrently with the respective active illumination traversal thereof. In one aspect of the invention, the collected active reflected radiation from a candidate target during the narrow illumination sweep thereof is converted into a series of radiation intensity values sequentially corresponding thereto. In this aspect, the series of radiation intensity values is used directly as the active signature of its corresponding candidate target. In this case, a desired target is discriminated from the detected candidate targets based on distinguishing characteristics between the series of radiation intensity values associated with each candidate target. In another aspect, an appropriate value is derived for each candidate target representative of the radiation intensity range of the values in the converted series correspondingly associated with each candidate target. In which case, a desired target is discriminated from the detected candidate targets based on the derived appropriate values correspondingly associated therewith.

A further aspect of the present invention includes using polarization properties of the active laser beam to further enhance the discrimination of a desired target from the detected candidate targets. For this aspect, the active source includes means for polarizing the generated laser beam and the active sensor includes means for rotating its direction of polarization relative to the transmitted laser radiation. A variation in the polarized radiation response from a detected candidate target corresponding to the rotation in the direction of polarization is measured and used as an additional characteristic for each candidate target to aid in the discrimination process.

BRIEF DESCRIPTION OF THE DRAWINGS

FIGS. 6, 7 and 8 are graphs of plotted series of radiation intensity values taken from designated pixel sweep areas of each of a number of selected candidate targets from the field of view of a passive sensor as exemplified by the model studies shown in FIGS. 3, 4 and 5.

DESCRIPTION OF THE PREFERRED EMBODIMENT

It has been recognized that air-borne electro-optical target recognition systems for weapon delivery generally include a laser spot target designator which is used for purposes of video tracking or the like. In these systems, the laser beam utilized for spot tracking is generally referenced to the line-of-sight of a passive sensor, like a television camera or forward looking infrared camera, for example. Thus, once the laser beam spot is positioned on a designated target, commonly known as target acquisition, video tracking may be initiated which causes the line-of-sight of the passive sensor or boresight to be locked onto the designated target.

Target acquisition may be performed manually by an operator using a video display system or automatically by a target recognition system using video information received from the passive sensor. In either case, discrimination of a target from other detected objects within a video scene is necessary before acquisition and video tracking can take place. At close ranges, distinguishing features of certain vehicular targets are readily discernible from natural background objects thus making the acquisition process relatively easy through perception. However, as the distance between a target and the passive sensor becomes greater and greater, image resolution is reduced substantially and the acquisition/designation chore increases in difficulty. For example, at ranges of about three to five kilometers, certain well known vehicular targets subtend only a few picture elements in the field of view of a passive sensor. At these ranges, especially with wide dynamic variations in natural illumination, thermal washout, and other environmental factors, the difficulty in discriminating a target from its background with any passive sensor, be it a television camera or forward looking infrared camera or a combination of both, is readily apparent.

Figure 1:
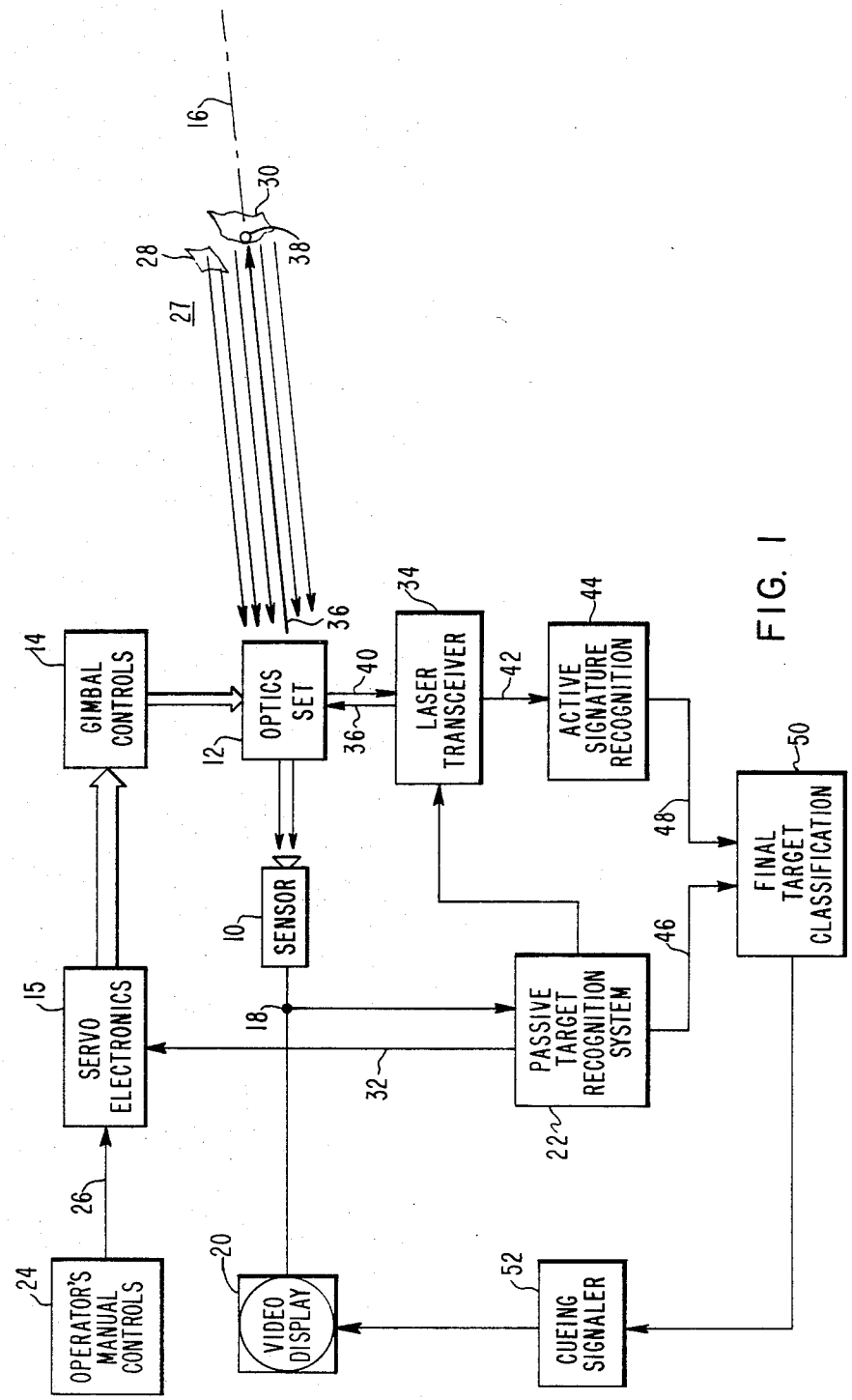
FIG. 1 is a block diagram schematic exemplifying a target recognition system suitable for emboding the principles of the present invention.

It has been further recognized that active illumination of a video scene, as evidenced by the previously referenced U.S. Pat. No. 3,953,667, augments the capability of a passive sensor to discern in a video scene certain details of a target which would not be readily apparent without the active illumination thereof. However, a full realization of this approach to implement the severe criteria associated such a passive/active system appears quite onerous and costly. On the other hand, the preferred embodiment of the present invention described herebelow permits a more simplified approach to the problem of target discrimination at extended ranges. The present embodiment proposes the utilization of existing laser spot target designator/video tracking apparatus to provide additional active image information to enhance the target recognition/acquisition process. A block diagram schematic exemplifying a target recognition system suitable for embodying the principles of the present invention is shown in FIG. 1. The system utilizes a laser spot target designator/video tracker similar to the type described in U.S. Pat. No. 4,034,208; entitled "Acceleration Aided Tracking Of A Designated Target"; issued to James E. Vaeth et al on July 5, 1977, which is referenced herein to provide a better understanding of the apparatus and operation thereof.

Referring to FIG. 1, the line-of-sight of a conventional passive sensor 10, which may be a television camera or forward looking infrared camera or a combination of the two, for example, may be controlled by a conventional optic set 12 which may be mounted and adjusted by a multi axis set of gimbal controls 14. The combination of elements 10, 12 and 14 are, at times, commonly referred to as a gimbaled sensor group of an electro-optical sensor system. The gimbal controls 14 are conventionally driven by a corresponding set of electronic servos 15, the embodiment of which being well known in the pertinent art, an example of which being disclosed in the aforementioned U.S. Pat. No. 4,034,208.

The video output 18 of the passive sensor 10, which may be of a conventional raster scan frame format, may be displayed on an operator's video display unit 20. The video output signal 18, being representative of the radiation intensity pattern of the field of view of the passive sensor 10, may also be provided to a conventional passive target recognition system 22. The line-of-sight 16 of the passive sensor 10 may be viewed on the video display 20 as the point at the intersection of a set of crosshairs (not shown).

An operator desiring to position the line-of-sight of the camera 10 on a particular object in the field of view thereof may do so through an operator's manual controls 24 which may be a two axis tracking handle, like a joy stick or some other manual positioning apparatus equivalent thereto. The operator's manual control 24 may provide a signal 26 to the servo electronics 15 in order to drive the gimbaled optic set combination 12 and 14 to position the line-of-sight of the camera sensor 10. For example, in the scenario depicted in FIG. 1 there may be a plurality of objects represented by the elements 28 and 30 viewed by the camera sensor 10 in its field of view 27. In this scenario, line-of-sight 16 may be positioned so that the field of view of the camera sensor 10 includes the plurality of elements including 28 and 30.

In another aspect of the preferred embodiment, the line-of-sight 16 of the camera sensor 10 may also be governed by the passive target recognition system 22 utilizing the signal line 32 which is provided to the servo electronics 15 from the target recognition system 22. The passive target recognition system 22 may have an embodiment and operate similar to the target recognition systems described in connection with the previously referenced U.S. Pat. Nos. 3,748,644; 3,638,188; and 3,636,513. The operation of the target recognition system 22 and its relationship to the present invention will become more fully understood as it is explained in further detail in the paragraphs found below.

In the present embodiment, the laser beam spot target designator may include a conventional laser transceiver 34 (i.e. transmitter/receiver) for generating a laser beam 36 substantially at a predetermined wavelength, say on the order of one micrometer, for example. In this embodiment, the transmitted beam 36 is co-aligned with the line of sight 16 of the camera sensor 12 and may be positioned colinearly therewith. In the scenario of FIG. 1, the laser beam 36 is positioned to spot illuminate the object 30 in the field of view 27 at a spot 38. Reflected active radiation from the illuminated spot 38 may be guided back to the receiver portion of the laser tranceiver 34 over path 40 by the optics set at 12. In a conventional sense, the laser beam receiver (not shown) may be an active sensor tuned to the predetermined transmitted wavelength of the laser beam for receiving the active laser radiation separately reflected from an individually illuminated object like that shown at 30.

Accordingly, the active laser beam sensor at 34 may convert the separately received active radiation into respective electrical signals representative of the radiation intensity thereof which then may be provided over a signal line 42 to an active signature recognition block 44 which may be utilized for deriving an active signature for the designated object 30 from the electrical signals provided thereto. It is understood that although the active signature may be obtained directly from the received intensity values, a simplified calibration of the system may be achieved by comparing radiation intensity received from candidate targets with radiation intensity received from background areas. For example, a single horizontal sweep through the target, including a sampling of background to the right and left thereof, may allow a determination of the radiation intensity difference associated with the candidate target. Signals 46 and 48 which may be representative of passive and active target signatures generated respectively by the recognition systems 22 and 44 may be provided to a final target classification block 50 for enhancing the recognition of the designated target. Once this is accomplished, the classifier 50 may, for example, govern a conventional cueing signaller 52 to provide an appropriate display to an operator through the video display unit 20.

Figure 2:
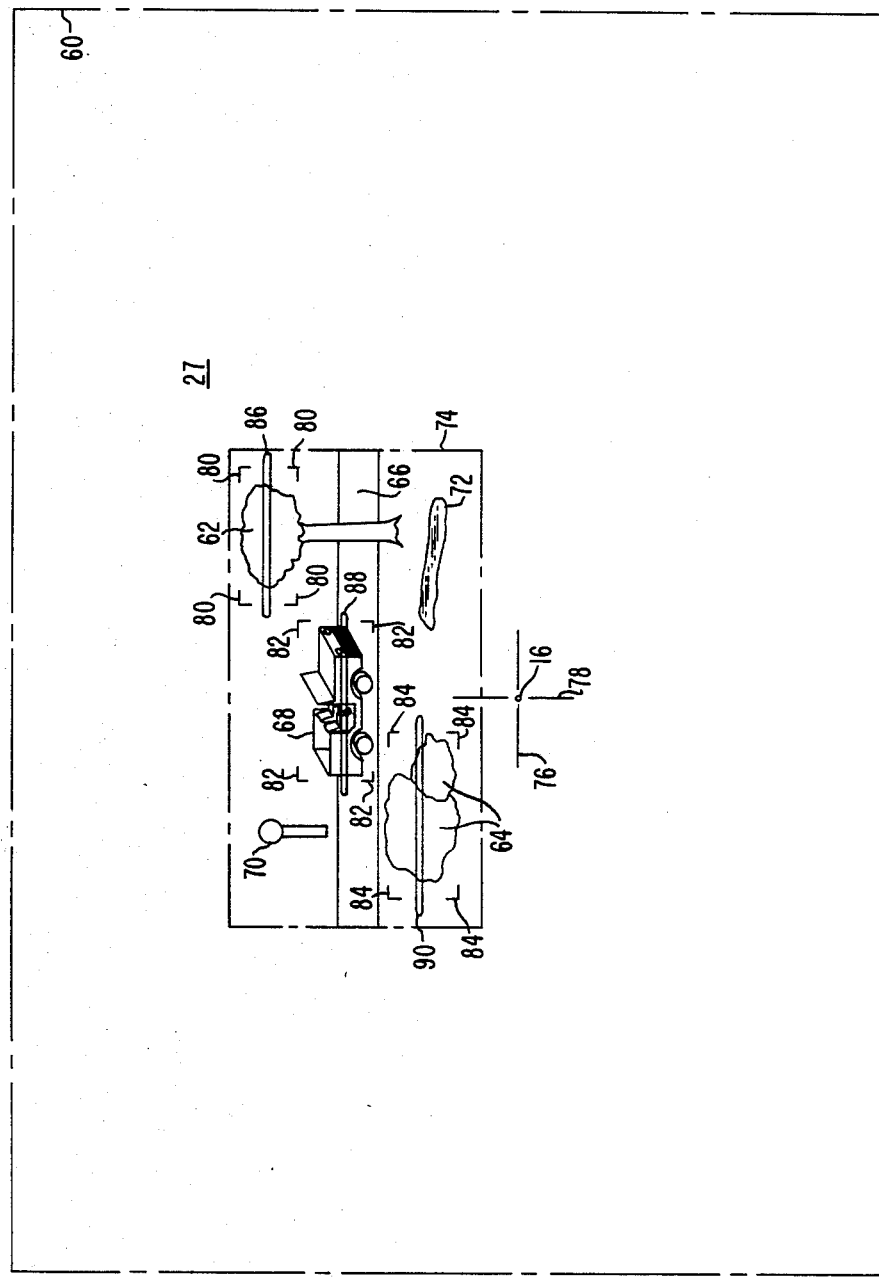
FIG. 2 is an illustration of an exemplary scene viewed by a passive sensor in its field of view.

To describe the operation of the preferred embodiment as depicted by the block diagram schematic of FIG. 1, a typical scenario of what an electro-optical target recognition system may expect to encounter in its field of view will be used. The exemplary scenario is one in which a jeep is traveling along a road with two bushes and a tree to the right of the road and a pole and a globe sitting in the background to the left of the road. In addition, a pool of water may lie somewhere in the foreground vicinity between the bushes and tree. This scene may be viewed by the camera sensor 10 in its field of view 27 as depicted in the illustration of FIG. 2. In FIG. 2, the outside dashed dot lines 60 encompass the representative field of view of the camera sensor 10 as displayed on the video display 20 and provided to the passive target recognition system 22.

In the present example, the tree 62, the bush combination 64, the road surface 66, the jeep 68, the pole and globe combination 70, and the pool of water 72 all show up as images within a small window outlined by the dot-dashed lines 74. The window area outlined by the dot-dashed lines 74 may encompass a 60×60 picture element array of the field of view 27. The intersection 16 of the crosshairs 76 and 78 represents the position of the line-of-sight 16 of the camera sensor 10 which, for the present embodiment, is colinear with the laser beam 36. Certain objects within the scene 74 may be preliminarily detected as candidate targets by either a manual operator or the passive target recognition system 22 using conventional target recognition methods. The image regions of the scene corresponding to the detected candidate targets may be outlined by cursors as shown by the illustration of FIG. 2. For example, the crown of the tree 62 is outlined by the image area defined by the cursors 80, the jeep 68 is outlined by the cursors 82 and similarly, the bush combination 64 is outlined by the cursors 84. Thus, once having defined the candidate targets within the scene, the positions of their corresponding defined image regions are known either by the operator perceptually or by the target recognition system 22 from the video format used.

Once having identified the positions of the corresponding candidate targets, it is possible to position the laser beam spot which is colinear with the line-of-sight 16 of the camera sensor 10 to illuminate individually each of the identified candidate targets, such as the crown of the tree 62, the jeep 68, and the bush combination 64, for example. This positioning may be accomplished either by the passive target recognition system 22 utilizing the governing signal line 32 or by the operator via operator's manual controls 24 and governing signal 26. In either case, the servo electronics 15 may be governed to adjust the gimbaled optics combination set 12 and 14 to position the laser beam 36/line-of-sight 16 wherever desired.

In accordance with the present invention, the laser beam spot is preferably positioned to traverse each defined candidate target region in the field of view individually to affect at least one narrow illumination sweep of each of the defined reions 80, 82 and 84. For example, for the region defined by the cursors 80, the narrow illumination sweep of the laser beam spot may pass through the area designated as 86. Likewise, narrow illumination sweeps of the laser beam spot may be traversed through the regions defined by the cursors 82 and 84 at 88 and 90, respectively. Active radiation may be reflected separately from each candidate target region concurrent with the respective active illumination traversal thereof and may be guided to the active laser radiation receiver at 34 along the path 40 by the optic set 12. Suitable modulation of the active radiation permits discrimination between active and passive energy.

Typically, the laser beam spot may be swept across the designated image area of the detected candidate target with a back and forth dither type motion for a plurality of illuminating sweeps. The intensity radiation pattern of each sweep may be collected in the active sensor of the laser transceiver 34 and converted into a series of radiation intensity values sequentially corresponding to the radiation received during each individual sweep. The converted series of intensity values may be provided to the active signature recognition block 44 over signal line 42. In one case, the active signature recognition block 44 may derive as the active signature of each candidate target its corresponding series of radiation intensity values which are provided to the final target classifier 50 over signal lines 48 in which case the classifier 50 may discriminate the desired target from the detected candidate targets based directly on distinguishing characteristics between the series radiation intensity values associated with each candidate target. This will become more readily apparent from the further descriptions found hereinbelow.

In another case, the active signature recognition block 44 may derive an appropriate value for each candidate target representative of the radiation intensity range of the values in the series correspondingly associated with each candidate target in which case these appropriate values are representative of the signatures of the candidate objects and are passed along to the final target classifier 50 over a signal line 48. The classifier 50 may then discriminate a desired target from the detected candidate targets based on the derived appropriate values correspondingly associated therewith.

The principles of the present embodiment are based on the premise that tactical vehicular targets such as tanks, jeeps, and the like, normally have smooth reflecting surfaces in which case the reflected active radiation from a laser spot beam illumination is narrowly collimated and except for very special surface orientations will go right past the active receiver sensor. Because of the low dispersion of the reflective active radiation from such targets, lower intensity levels will be picked up by the active sensor receiver during individual active illumination thereof. On the other hand, natural background objects, such as bushes and trees and the like, generally reflect active radiation in randomly dispersed patterns because of the widely varying and different textures of the surfaces thereof. Under these conditions, much higher intensity levels will be picked up by the active sensor receiver during active individual illuminations of these type natural background objects. Thus, in comparing the radiation intensity patterns or signatures picked up by the active sensor receiver, certain desired targets may be discriminated from their natural surroundings due primarily to the special makeup of their discriminating active signatures resulting from the individual active illumination sweeps thereof.

Analytical or empirical data to substantiate that active radiation returns from certain targets differ in radiation intensity signature patterns from natural background objects have been obtained from computer modeling of images of targets and background objects for a variety of spectral bands for both active and passive sensing systems. These computer model images take into account spatial resolution at various ranges, meteorological conditions, atmospheric conditions, ... etc. All of the measured radiation intensity reflectivity data for both background objects and target surfaces are based on information obtained from the Environmental Research Institute of Michigan (ERIM). The simulated image models have been validated in previous studies.

Figure 3:
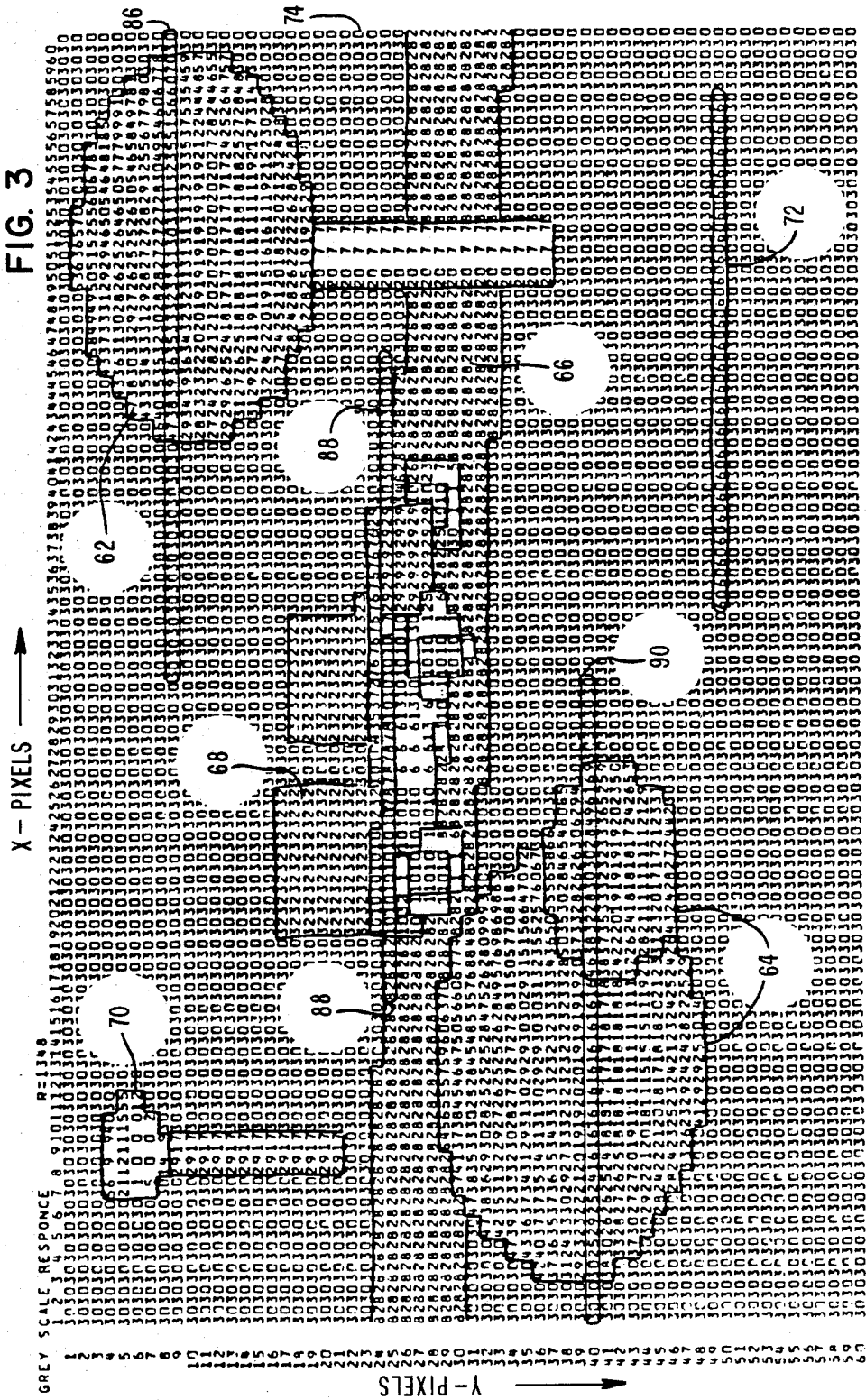
FIGS. 3, 4 and 5 are illustrative sample examples selected from computer modeling research studies of elemental arrays of radiation intensity patterns representative of the scene illustrated in FIG. 2.
Figure 4:
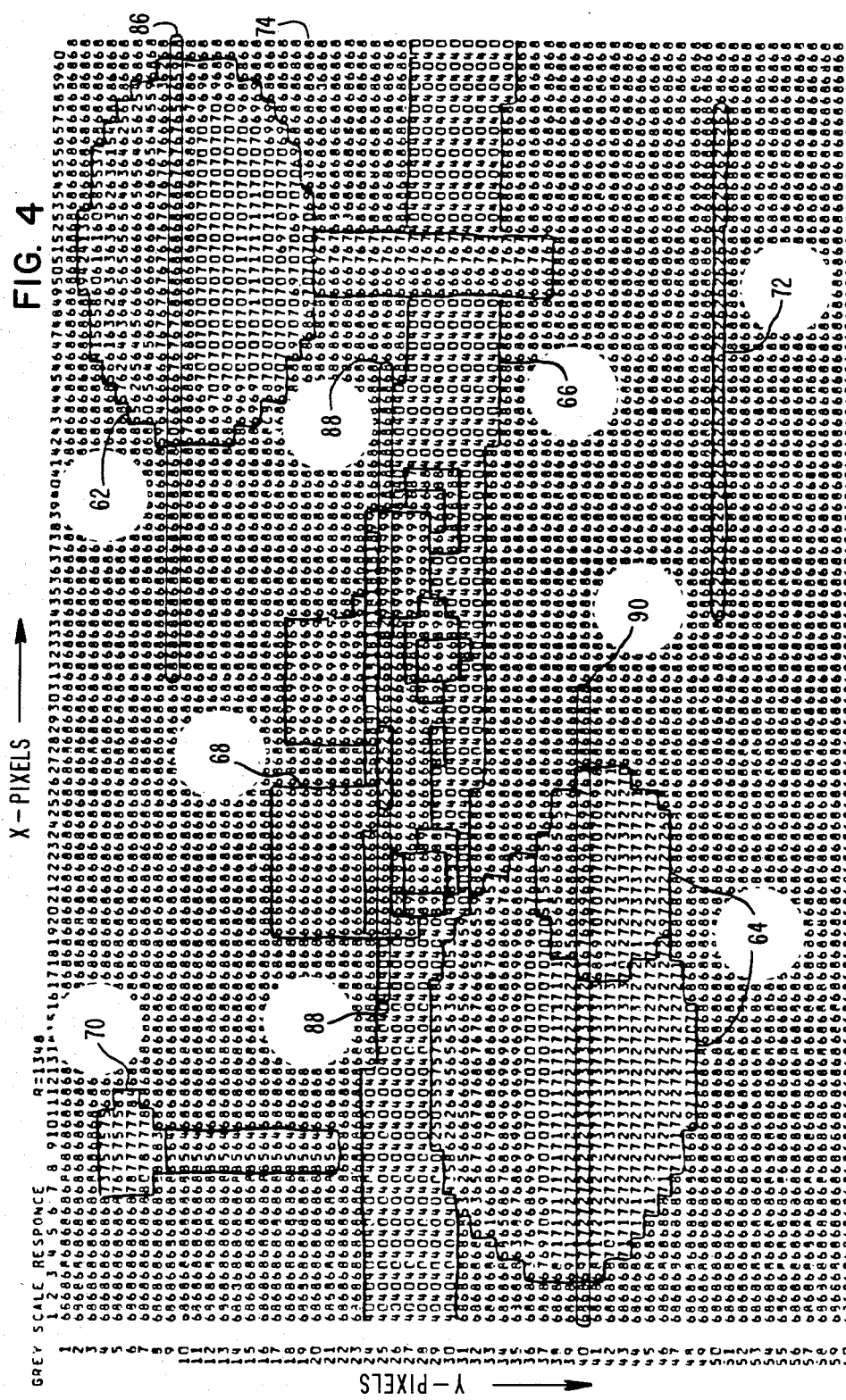
Figure 5:
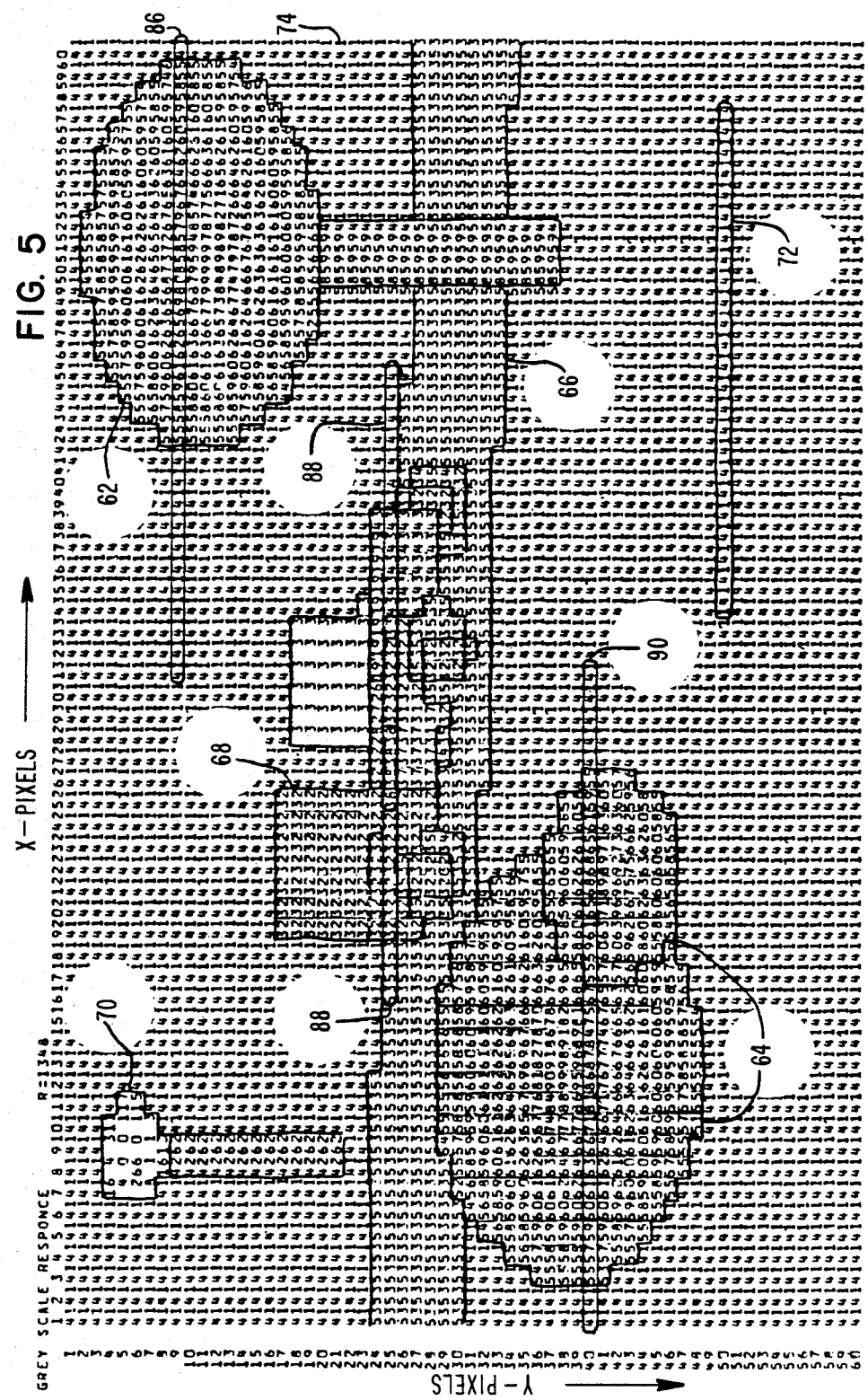

For the purpose of illustration, three sample examples have been selected from the computer modeling research studies and are depicted in FIGS. 3, 4 and 5. Each illustrative example contains a 60×60 picture element array of radiation intensities representative of the scene as described in connection with the field of view illustration of FIG. 2. The radiation intensities within each representative image are denoted by numbers from 0 to 99, 99 being the highest received radiation intensity. FIG. 3 represents the received scene radiation intensities obtained from a passive SIV TV sensor, FIG. 4 for a passive FLIR sensor in the 8–13 micron wavelength range, and FIG. 5 for an active laser at a wavelength of 1.06 microns. The images in the scene are sized to represent a range of about 8000 feet with no convolution between adjacent picture elements due to limited sensor resolution. It is understood that at greater ranges additional atmospheric attenuation may be introduced, and blurring of the images may occur as a function of the sensor and its optics.

Based on the description of the preferred embodiment as depicted in FIG. 1, the passive target recognition system 22 may separate three regions from the scene as detected candidate targets—the jeep 68, the two bushes 64, and the crown of the tree 62 (refer to FIG. 2). Perceptually, with the resolution shown in FIGS. 3, 4 and 5, discrimination between the desired target, being the jeep 68, and background objects, being the tree 62 and bushes 64, would be relatively simple based upon the detailed edge structures thereof. However, at greater distances there will exist lower resolution and the discrimination process would thus become progressively more difficult with the possibility of a false alarm or false omission increasing. Even at the lower resolution, given an adequate number of picture elements, say on the order of 6 to 8 in the smallest dimension of the candidate target, the radiation intensities of the candidate regions may still be examined to see if a basis exists for the discrimination therebetween.

With reference to FIGS. 3 and 4, representative radiation intensity ranges for the identified candidate object regions in connection with the passive sensor pickups are as shown in the following table:

TABLE 1

|  | TV | FLIR |
| --- | --- | --- |
| Jeep (68) | 1–76 | 0–99 |
| Two Bushes (64) | 11–64 | 32–73 |
| Tree Crown (62) | 11–78 | 36–70 |

The low resolution example may be simulated by averaging the radiation intensity values of a 3×3 picture element window. Representative averaging results for low resolution examples are estimated in the following table:

TABLE 2

|  | TV | FLIR |
| --- | --- | --- |
| Jeep (68) | 7–32 | 40–99 |

TABLE 2-continued

|  | TV | FLIR |
|---|---|---|
| Two Bushes (64) | 13–45 | 40–73 |
| Tree Crown (62) | 15–40 | 55–71 |

Now the same analysis may be applied to the radiation intensity values in connection with an active laser illumination ($\lambda = 1.06$ μm) as depicted in FIG. 5 with representative results tabulated in the following table:

TABLE 3

|  | TV | FLIR |
|---|---|---|
| Jeep (68) | 3–43 | 3–43 |
| Two Bushes (64) | 51–99 | 55–95 |
| Tree Crown (62) | 44–99 | 55–95 |

Where target to clutter contrast is low for passive electro-optical systems, comparison of Tables 1, 2 and 3 above reveals the advantage of the active illumination to enhance radiation intensity contrast. In the case using a TV passive sensor, as shown in FIG. 3, the jeep 68 has limited radiation intensity areas which are a little lighter than the bushes 64, but these would be highly sensitive to aspect. General experience with TV imagery shows that trees or bushes are easily confused with vehicular targets at long ranges. In the 8–13 micron FLIR case, higher radiation intensity response is obtained from the engine compartment of the jeep 68 than from either the bushes 64 or tree crown 62, and this intensity contrast is unaffected by resolution. It is generally well known that the low response areas disappear at lower resolutions. Thus, the separation of vehicular targets from background objects is generally easier with FLIR passive sensors than with TV cameras, based solely on the presence of hot spots in the vehicular targets. However, if the engines of the vehicular targets are off and cool, or at certain times of the day due to thermal washout, this criterion may be unreliable.

To emphasize the effectiveness of the active laser beam spot sweeps through the designated target regions, FIGS. 6, 7 and 8 have been prepared from the computer simulation model radiation intensity values of FIGS. 3, 4 and 5, respectively. Thirty pixel linear sweeps were taken through the identified candidate target regions at the designated coordinates as denoted in the FIGS. 6, 7 and 8. For example, the active laser beam spot illumination sweep through the jeep 68 is at $Y=25$ and extends from $X=16$ through $X=45$, for the bushes 65, the sweep is at $Y=40$ and extends from $X=1$ through $X=30$, and for the tree crown 62, the sweep is at $Y=9$ and extends from $X=31$ through $X=60$. The radiation intensity values at each of the designated pixel sweep areas are plotted in the graphs of FIGS. 6, 7 and 8.

Referring to FIG. 6 which is the radiation reflectivity case for the TV camera, it is shown that there is no clear discrimination pattern in the ranges of radiation intensity reflectivity from the series of values plotted therein. A similar display is shown in the graph of FIG. 7 which is the example of a FLIR camera for the three identified candidate objects.

On the other hand, the plotted series of radiation intensity values in the graph of FIG. 8 are representative of the reflected radiation intensity patterns of an active laser beam spot illumination sweep through each of the identified candidate object regions as designated by the coordinates as shown. There exists a clear discriminatory separation between the radiation intensity pattern signature of the jeep 68 and the bushes 64 and tree crown 62 background objects. Thus, with the active laser illumination sweeps, the separation in the radiation intensity signatures is clearly superior and dramatic from those of the passive sensors as exhibited by the graphs of FIGS. 6, 7 and 8. Furthermore, even the entire intensity ranges between the desired target and background objects are totally separate for both resolutions as exhibited by the tabulations in Table 3. Even in the low resolution case which is representative of very long ranges, when the entire identified candidate target may subtend only a few pixels in its smallest dimension, any discrimination method using the ranges of intensity values would still be accurate. Therefore, as has been described hereabove in connection with the embodiment depicted in FIG. 1, the active signature recognition block 44 may use the series of intensity values received in connection with the laser beam spot illumination sweeps of the various identified candidate targets directly as the representative signatures thereof or indirectly by deriving or appropriate values representative of the radiation intensity ranges of values of the series as the representative signature of each of the corresponding detected candidate targets. In either case this information may be provided to the final classifier 50 via signal line 48 wherein a final discriminatory classification may be performed based on the additional active signatory information provided thereto.

Aside from target discrimination enhanced by response-level signatory information corresponding to active source (laser) illumination as described hereabove, another aspect of the present invention pertains to the use of the polarization properties of an active laser transceiver system such as that described in connection with the embodiment of FIG. 1. It is well known that emissions from active source lasers may be polarized either internally as part of the laser apparatus itself or externally using conventional polarizers. In addition, active polarized radiation response from natural objects, such as trees, bushes, shrubs, or the like, varies by only a few percent as the direction of polarization of the active receiver is rotated relative to the transmitted energy. This phenomenon is due primarily to the effect of random scattering of polarized radiation from the illuminated objects. On the other hand, the reflections of polarized laser radiation from illuminated vehicular objects, such as tanks, jeeps, or the like, tends to be specular in nature and is dependent on variables such as the orientation of the object and the nature and thickness of the coating materials on the surface thereof, for example. As a result, there is a strong variation in radiation response from vehicular surfaces which are normal to the line-of-sight of the active transceivers, sometimes on the order of 10 to 1. However, the amount of response variation is reduced as the vehicular surface moves away from the normal, and the total response at high angles becomes much less than the response from natural surfaces. Therefore, the variation in polarized response from a detected candidate object corresponding to the rotation in the direction of polarization of the active sensor provides an additional measurement to that of the active response-level signatory information described supra to discriminate desired vehicular targets from the overall detected candidate targets.

We claim:

1. An electro-optical target recognition system which operates on both active and passive radiation from the field of view thereof to discriminate desired targets from detected candidate targets, said system comprising:
- at least one passive sensor for receiving passive image radiation from the field of view thereof and converting said received image radiation into first electrical signals representative thereof;
- a passive target recognition means for operating on said first electrical signals to detect candidate targets in said field of view of said passive sensor;
- an active source for generating a laser beam substantially at a predetermined wavelength;
- means for positioning said laser beam to illuminate individually each of said candidate targets detected by said passive target recognition means;
- an active sensor tuned to said predetermined wavelength for receiving the active laser radiation separately reflected from said individually illuminated candidate targets and converting said separately received active laser radiation into respective second electrical signals representative thereof;
- means by deriving an active signature for each of said detected candidate targets from said respective second electrical signals; and
- means operative to discriminate a desired target from said detected candidate targets in said field of view of said passive sensor based on said derived active target signatures thereof prior to acquisition and tracking of said desired target.

2. The electro-optical target recognition system in accordance with claim 1 wherein the positioning means includes means for traversing each detected candidate target region in the field of view individually with the laser beam to effect at least one narrow illumination sweep of each of said regions; and wherein the active sensor includes means operative to collect the active reflected radiation separately from each candidate target region concurrently with the respective active illumination traversal thereof.

3. The electro-optical target recognition system in accordance with claim 2 wherein the active sensor includes means for converting the collected active reflected radiation from a candidate target during the narrow illumination sweep thereof into a series of radiation intensity values sequentially corresponding thereto; wherein the deriving means uses the series of radiation intensity values associated wth each candidate target directly as the active signature thereof; and wherein the discriminating means discriminates a desired target from the detected candidate targets based on distinguishing characteristics between said series of radiation intensity values associated with each candidate target.

4. The electro-optical recognition system in accordance with claim 2 wherein the active sensor includes means for converting the collected active reflected radiation from a candidate target during a plurality of narrow illumination sweeps thereof into a series of radiation intensity values sequentially corresponding thereto; wherein the deriving means derives an appropriate value for each candidate target representative of the radiation intensity range of the values in the converted series correspondingly associated with each candidate target; and wherein the discriminating means discriminates a desired target from the detected candidate targets based on said derived appropriate values correspondingly associated therewith.

5. An electro-optical target recognition system in accordance wih claim 1 wherein the active source includes means for polarizing the generated laser beam; and wherein the active sensor includes means for rotating its direction of polarization relative to the transmitted laser radiation to determine the variation in the polarized radiation response from a detected candidate target corresponding to said rotation in the direction of polarization whereby said determined variation may be used as an additional measurement for each candidate target beyond the derived active target signatures thereof to further enhance the discrimination of a desired target from the detected candidate targets.

6. Method of discriminating desired targets from detected candidate targets in accordance with both active and passive radiation received from the field of view of an electro-optical target recognition system, said method comprising the steps of:
- receiving passive image radiation from the field of view of at least one passive sensor;
- detecting candidate targets in the field of view of said passive sensor from the passive image radiation received thereby;
- generating a laser beam substantially at a predetermined wavelength by an active source;
- positioning said laser beam to illuminate individually each of said detected candidate targets;
- receiving the active laser radiation separately reflected from said individually illuminated candidate targets by an active sensor;
- deriving an active signature for each of said detected candidate targets from said active laser radiation received separately therefrom; and
- discriminating a desired target from said detected candidate targets in said field of view of said passive sensor based on said derived active signatures thereof prior to acquisition and tracking of said desired target.

7. The method in accordance with claim 6 wherein the step of positioning includes traversing each detected candidate target region in the field of view individually with the laser beam to effect at least one narrow illumination sweep of each of said regions; and wherein the step of receiving the active laser radiation includes collecting the active reflected radiation separately from each candidate target region concurrently with the respective active illumination sweep thereof.

8. The method in accordance with claim 7 includes the steps of:
- converting the collected active reflected radiation from a candidate target during the narrow illumination sweep thereof into a series of radiation intensity values sequentially corresponding thereto;
- using the series of radiation intensity values associated with each candidate target directly as the active signature thereof; and
- discriminating a desired target from the detected candidate targets based on distinguishing characteristics between said series of radiation intensity values associated with each candidate target.

9. The method in accordance with claim 7 includes the steps of:
- converting the collected active reflected radiation from a candidate target during a plurality of narrow illumination sweeps thereof in a series of radiation intensity values sequentially corresponding thereto;
- deriving an appropriate value for each candidate target representative of the radiation intensity range of the values in the converted series correspondingly associated with each candidate target; and discriminating a desired target from the detected candidate targets based on said derived appropriate values correspondingly associated therewith.

10. The method in accordance with claim 6 including the steps of:

polarizing the generated laser beam;

rotating the direction of polarization of the active sensor relative to the transmitted laser beam;

measuring the variation in the polarized radiation response from a detected candidate target corresponding to said rotation in the direction of polarization;

using said measured variation as an additional discriminating characteristic for discriminating a desired target from the detected candidate targets in the field of view of the passive sensor.

* * * * *